United States Patent
Guo et al.

(10) Patent No.: US 11,856,035 B2
(45) Date of Patent: Dec. 26, 2023

(54) NETWORK NODES AND METHODS PERFORMED THEREIN FOR HANDLING DISCOVERY OF ENTRANCE POINTS TO AN IP MULTIMEDIA SUBSYSTEM

(71) Applicant: Telefonaktiebolaget LM Ericsson (publ), Stockholm (SE)

(72) Inventors: Liangliang Guo, Shanghai (CN); George Foti, Dollard-des-Ormeaux (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 54 days.

(21) Appl. No.: 17/597,194

(22) PCT Filed: Jul. 1, 2019

(86) PCT No.: PCT/CN2019/094249
§ 371 (c)(1),
(2) Date: Dec. 29, 2021

(87) PCT Pub. No.: WO2021/000229
PCT Pub. Date: Jan. 7, 2021

(65) Prior Publication Data
US 2022/0247798 A1    Aug. 4, 2022

(51) Int. Cl.
*H04L 65/1069* (2022.01)
*H04L 65/1016* (2022.01)
(Continued)

(52) U.S. Cl.
CPC ...... *H04L 65/1069* (2013.01); *H04L 65/1016* (2013.01); *H04L 65/1045* (2022.05); *H04L 65/1073* (2013.01)

(58) Field of Classification Search
CPC . H04L 12/66; H04L 65/1016; H04L 65/1069; H04L 67/1014; H04L 61/2528;
(Continued)

(56) References Cited

U.S. PATENT DOCUMENTS

| 10,285,123 B2 * | 5/2019 | Lemieux | H04L 65/1016 |
| 2008/0175157 A1 * | 7/2008 | Lim | H04L 65/1073 370/242 |

(Continued)

FOREIGN PATENT DOCUMENTS

CN    109391979 A    2/2019

OTHER PUBLICATIONS

International Search Report and Written Opinion for Application No. PCT/CN2019/094249, dated Mar. 26, 2020, 7 pages.
(Continued)

*Primary Examiner* — Dustin Nguyen
(74) *Attorney, Agent, or Firm* — Nicholson De Vos Webster & Elliott LLP

(57) ABSTRACT

A method performed by a network node in a communications network, for handling of discovery of entrance points of a User Equipment (UE) to an IP Multimedia Subsystem (IMS) network, during an IMS Protocol Data Unit (PDU) session setup. The network node obtains a list of IMS entrance point instances, wherein the list of IMS entrance point instances comprises an address of each IMS entrance point instance and one or more transport protocols supported by each IMS entrance point instance. The network node generates, based on the obtained list of IMS entrance point instances, a configuration message for IMS entrance point discovery, comprising the address of the IMS entrance point instance and the one or more transport protocols supported
(Continued)

by each IMS entrance point instance. The network node further provides to the UE the generated configuration message.

11 Claims, 13 Drawing Sheets

(51) Int. Cl.
  *H04L 65/1045* (2022.01)
  *H04L 65/1073* (2022.01)
(58) Field of Classification Search
  CPC ........... H04L 61/5014; H04L 65/1073; H04W 48/18; H04W 60/005; H04W 4/50; H04W 76/32; H04W 88/182
  See application file for complete search history.

(56) References Cited

U.S. PATENT DOCUMENTS

| | | | | |
|---|---|---|---|---|
| 2012/0215930 | A1* | 8/2012 | Stenfelt | H04L 12/66 709/228 |
| 2013/0185440 | A1* | 7/2013 | Blau | H04L 61/2528 709/227 |
| 2015/0195864 | A1* | 7/2015 | Bartolome | H04W 88/182 370/221 |
| 2015/0264106 | A1* | 9/2015 | Baek | H04L 65/1016 709/203 |
| 2016/0249401 | A1* | 8/2016 | Tanaka | H04L 65/1069 |
| 2017/0339655 | A1* | 11/2017 | Keller | H04W 60/005 |
| 2017/0374614 | A1* | 12/2017 | Lemieux | H04L 65/1016 |
| 2018/0041495 | A1* | 2/2018 | Lindholm | H04W 76/32 |
| 2018/0183839 | A1* | 6/2018 | Chiang | H04L 65/1069 |
| 2018/0213587 | A1 | 7/2018 | Kim et al. | |
| 2018/0234465 | A1* | 8/2018 | Kim | H04L 61/5014 |
| 2018/0288582 | A1 | 10/2018 | Buckley et al. | |
| 2018/0309800 | A1* | 10/2018 | Aravamudhan | H04L 65/1069 |
| 2019/0075139 | A1* | 3/2019 | Bouvet | H04L 67/1014 |
| 2020/0120146 | A1* | 4/2020 | Christopher | H04L 65/1016 |
| 2020/0329075 | A1* | 10/2020 | Zhang | H04L 65/1016 |
| 2021/0014780 | A1* | 1/2021 | Qiao | H04W 48/18 |
| 2021/0058435 | A1* | 2/2021 | Sharma | H04L 65/1069 |
| 2021/0320897 | A1* | 10/2021 | Stojanovski | H04W 4/50 |

OTHER PUBLICATIONS

3GPP TS 23.228 V16.0.0, "3rd Generation Partnership Project; Technical Specification Group Services and System Aspects; IP Multimedia Subsystem (IMS); Stage 2 (Release 16)," Mar. 2019, 336 pages, 3GPP Organizational Partners.

3GPP TS 23.501 V16.0.0, "3rd Generation Partnership Project; Technical Specification Group Services and System Aspects; System Architecture for the 5G System; Stage 2 (Release 16)," Mar. 2019, 318 pages, 3GPP Organizational Partners.

3GPP TS 23.502 V16.0.0, "3rd Generation Partnership Project; Technical Specification Group Services and System Aspects; Procedures for the 5G System; Stage 2 (Release 16)," Mar. 2019, 420 pages, 3GPP Organizational Partners.

3GPP TS 24.229 V16.0.0, "3rd Generation Partnership Project; Technical Specification Group Core Network and Terminals; IP multimedia call control protocol based on Session Initiation Protocol (SIP) and Session Description Protocol (SDP); Stage 3 (Release 16)," Dec. 2018, 1043 pages, 3GPP Organizational Partners.

China Mobile, "Annex for 5G IP-CAN," Aug. 21-25, 2017, 10 pages, 3GPP TSG-CT WG1 Meeting #105, C1-173566, Krakow, Poland.

Deutsche Telekom, "Correction to P-CSCF restoration procedures," May 13-17, 2019, 5 pages, 3GPP TSG-CT WG1 Meeting #117, C1-193643, Reno, Nevada.

* cited by examiner

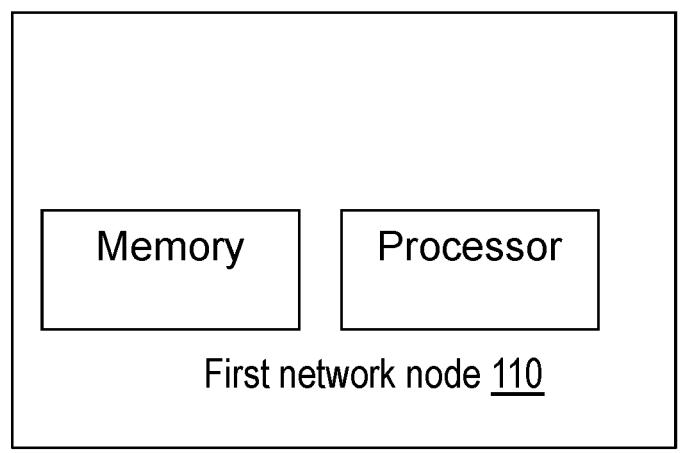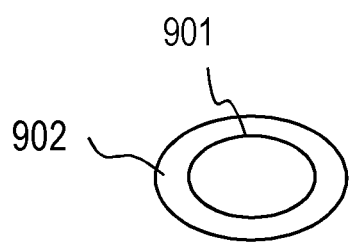
Fig. 9

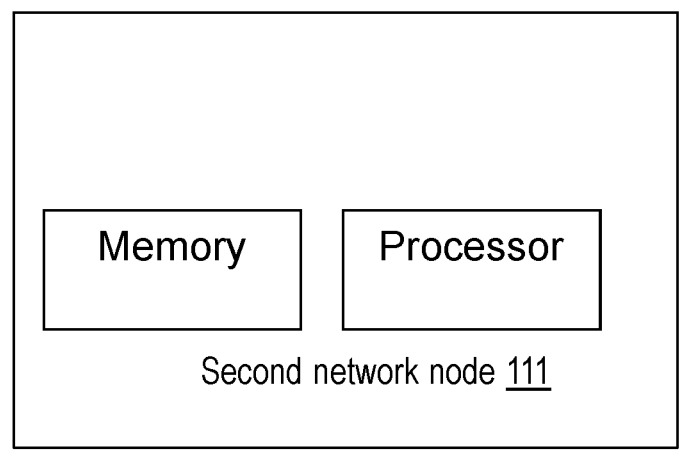
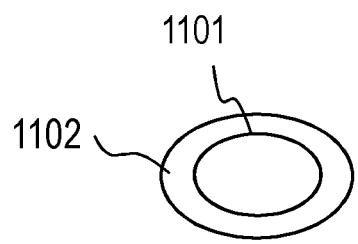
Fig. 11

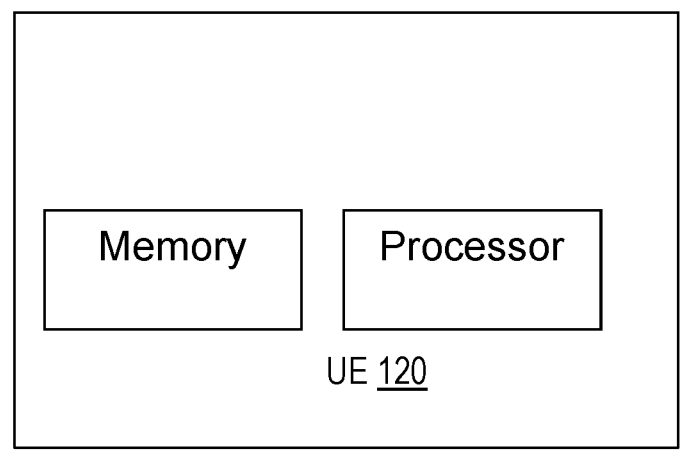
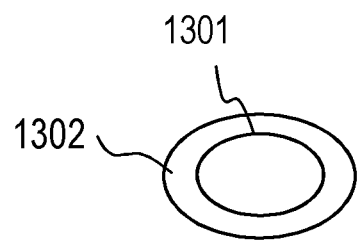
Fig. 13

NETWORK NODES AND METHODS PERFORMED THEREIN FOR HANDLING DISCOVERY OF ENTRANCE POINTS TO AN IP MULTIMEDIA SUBSYSTEM

CROSS-REFERENCE TO RELATED APPLICATIONS

This application is a National stage of International Application No. PCT/CN2019/094249, filed Jul. 1, 2019, which is hereby incorporated by reference.

TECHNICAL FIELD

Embodiments herein relate to network nodes, a User Equipment (UE) and methods performed therein for handling discovery of entrance points to an IP Multimedia Subsystem (IMS).

BACKGROUND

In a typical wireless communication network, wireless devices, also known as wireless communication devices, mobile stations, stations (STA) and/or User Equipment (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node. A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipment. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core network nodes and in some cases even to different core networks, e.g. in RAN sharing deployments.

The 3GPP has defined an IP Multimedia Subsystem (IMS) as a communication service provider network for both 4G LTE and 5G NR.

For the 5G system (as described in 3GPP TS23.501) a 5G package core network has been defined where the network functions interact with each other in a service-based approach:

Network Functions, such as e.g. Access Management Function (AMF), within the control plane enable other authorized network functions to access their services.

NFs use service Network Repository function to perform a service registration and de-registration of itself for addressing;

NFs use the NF discovery service to find registered NFs and their provided services;

The discovery service is provided by a Network Function Repository Function (NRF) as follows:

The NRF supports a service discovery service. The NRF may receive an NF Discovery Request from an NF instance, and provides the information of the discovered NF instances (to be discovered) to the requesting NF instance.

The NRF maintains a NF profile of available NF instances and their supported services. The NF profile is the information that NFs provide in NF service registration.

The IMS and new 5G Core (5GC) together provides Multi-Media Service, e.g. voice or video for the 5G system.

A Proxy Call Serving Call Control Function (P-CSCF) is a first entry point for the UE to access the IMS for communication services. Prior to a traffic use case, the UE must know which P-CSCF it shall communicate with. In order to do this the UE performs a process which may be referred to as P-CSCF discovery, during which the UE receives the addresses of the P-CSCFs.

In the 5GC, a Session Management Function (SMF) supports the capability to send the P-CSCF address or addresses to the UE at PDU Session Establishment procedure related to IMS. If Local Breakout (LBO) is used, which may also be referred to as roaming, the SMF may be located in a Visited Public Land Mobile Network (VPLMN). The addresses are sent by the visited SMF if LBO is used. For Home routed, this information is sent by the SMF in the Home Public Land mobile Network (HPLMN).

With the current P-CSCF discovery procedure in 5GC, only IP-addresses of the P-CSCF are returned to the UE. This has the drawback that operators have to configure other parameters, such as e.g. transport protocol to be used, in the UE in other way, or rely on the UE to select transport protocol on random. Configuring each UE is time consuming, difficult and costly for the operators to handle. Allowing the UE to randomly select transport protocols means that the operators cannot control which transport protocol that is used. Depending on the scenario which the UE operates in, different transport protocols may be more beneficial to use. In some scenarios using e.g. TCP has advantage in terms of call setup time, while in other deployment scenarios using the UDP might be better. Hence the current P-CSCF discovery procedure has the drawback that the capability of the network is not fully utilized which may reduce the performance of the network.

SUMMARY

An object of embodiments herein is to provide a method for handling discovery of entrance points of a UE to an IMS network, during an IMS PDU session setup, which method increases the performance of the network and reduces the cost and effort for configuring the UEs.

The embodiments herein solve this by providing a method where the SMF supports fetching a list of P-CSCF addresses with transport protocol, such as UDP/TCP, by using information received from 5GS service discovery procedure. The list may be inserted into a Protocol Configuration Option (PCO), which is then sent to the UE at PDU Session Establishment procedure related to IMS P-CSCF discovery procedure in 5GC.

According to a first aspect of embodiments herein, the object is achieved by a method performed by a first network node in a communications network, for handling of discovery of entrance points of a UE to an IMS network, during an IMS PDU session setup. The first network node obtains a list of IMS entrance point instances, wherein the list of IMS entrance point instances comprises an address of each IMS entrance point instance and one or more transport protocols supported by each IMS entrance point instance. The first network node generates, based on the obtained list of IMS entrance point instances, a configuration message for IMS entrance point discovery, comprising the address of the IMS entrance point instance and the one or more transport protocols supported by each IMS entrance point instance. The first network node provides the generated configuration message to the UE.

According to a second aspect of embodiments herein, the object is achieved by a method performed by a second network node in the communications network, for handling of discovery of entrance points of a UE to the IMS network, during an IMS PDU session setup. The second network node provides, to the first network node, a list of IMS entrance point instances available in the second network node. The list of IMS entrance point instances comprises an address of each IMS entrance point instance and one or more transport protocols supported by each IMS entrance point instance.

According to a third aspect of embodiments herein, the object is achieved by a method performed by a UE in the communications network, for handling of discovery of entrance points of the UE to the IMS network, during an IMS PDU session setup. The UE receives, from the first network node, a configuration message comprising a list of IMS entrance point instances available in a second network node. The list of IMS entrance point instances comprises an address of each IMS entrance point instance and one or more transport protocols supported by each IMS entrance point instance. The UE performs, based on the received list of IMS entrance point instances available in the second network node, a registration to the IMS via the second network node.

According to a fourth aspect of embodiments herein, the object is achieved by a first network node in the communications network, for performing a method for handling of discovery of entrance points of a UE, to an IMS network, during an IMS PDU session setup The first network node is configured to obtain a list of IMS entrance point instances, wherein the list of IMS entrance point instances comprises an address of each IMS entrance point instance and one or more transport protocols supported by each IMS entrance point instance. The first network node is configured to generate, based on the obtained list of IMS entrance point instances, a configuration message for IMS entrance point discovery, comprising the address of the IMS entrance point instance and the one or more transport protocols supported by each IMS entrance point instance. The first network node is further configured to provide, to the UE, the generated configuration message.

According to a fifth aspect of embodiments herein, the object is achieved by a second network node in the communications network, for performing a method for handling of discovery of entrance points of a UE to an IMS network, during an IMS PDU session setup. The second network node is configured to provide, to a first network node, a list of IMS entrance point instances available in the second network node, wherein the list of IMS entrance point instances comprises an address of each IMS entrance point instance and one or more transport protocols supported by each IMS entrance point instance.

According to a sixth aspect of embodiments herein, the object is achieved by a UE in a communications network, for performing a method for handling of discovery of entrance points of the UE to an IMS network, during an IMS PDU session setup. The UE is configured to receive, from a first network node, a configuration message comprising a list of IMS entrance point instances available in a second network node. The list of IMS entrance point instances comprises an address of each IMS entrance point instance and one or more transport protocols supported by each IMS entrance point instance. The UE is further configured to perform, based on the received list of IMS entrance point instances available in the second network node, a registration to the IMS via the second network node.

In the previous solution, there is no way of configuring the transport protocol and port number to be used in the network. The operator thus has to configure the UE, which is more difficult and time consuming to handle since there are a lot of different vendors, providing a large number of different UEs to configure. By providing the transport protocol supported by each IMS entry point instance upon discovery, such as P-CSCF discovery, the preferred transport protocol to be used may be provided to the UE during IMS PDU establishment. The solution according to the embodiments herein can thus be used to control that a first transport protocol, such as e.g. TCP, shall always be used instead of a second transport protocol, such as e.g. UDP in certain scenarios.

The advantage of the embodiments herein is that the maintaining of the IMS entrance point addresses, such as P-CSCF addresses, with transport info is fully automatic. The solution provided by the embodiments herein is thus automation and cloud deployment ready.

The embodiments proposed herein further provide a network-based approach to decide whether the first transport protocol, the second transport protocol or both shall be used for the UE to setup a call, which allows the performance of the network to be improved since the UE does not perform random transport protocol selection.

An aligned 5GC Service Based Architecture is further provided by reusing service discovery mechanisms provided by the NRF.

BRIEF DESCRIPTION OF THE DRAWINGS

Embodiments will now be described in more detail in relation to the enclosed drawings, in which:

FIG. 9 is a block diagram illustrating some second embodiments of the first network node according to embodiments herein;

FIG. 11 is a block diagram illustrating some second embodiments of the second network node according to embodiments herein;

FIG. 13 is a block diagram illustrating some second embodiments of the UE according to embodiments herein.

DETAILED DESCRIPTION

As a part of developing embodiments herein the inventors identified a problem which first will be discussed.

Figure 1:
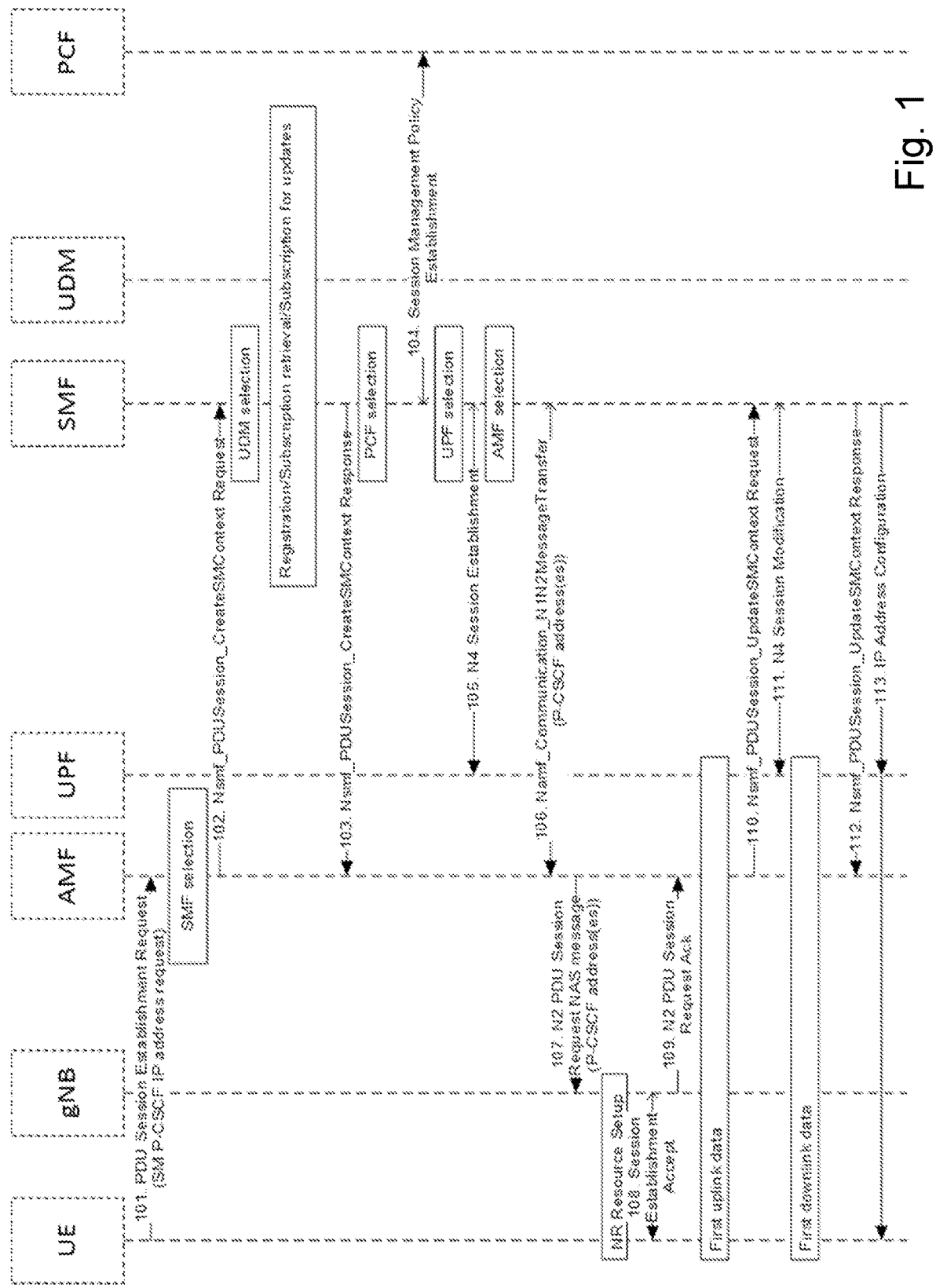
FIG. 1 is a signaling diagram depicting a current IMS PDU session establishment procedure.

The mechanism currently used for P-CSCF discovery is that the 5GC or 5G Evolved Packet Core (EPC) delivers the P-CSCF IP addresses and only IP addresses (IPv6 or IPv4 IP address) for each P-CSCF via a Namf_Communication_N1N2MesssageTransfer message to the UE during the UE's initiation of IMS Protocol Data Unit (PDU) session establishment as shown in actions 101-114 in FIG. 1.

Action 101. The UE initiates IMS PDU session establishment by sending a PDU Session Establishment Request. During the request, UE indicates it expects the P-CSCF to be returned as part of P-CSCF discovery.

Action 102-105. IMS PDU establishment request as per 3GPP TS 23.502, is performed.

Action 106 and Action 107. The addresses of the P-CSCF are provided to the UE from the SMF via the AMF and the gNB in the PCO field of a request Non-Access-Stratum message.

Action 108. The session establishment request is agreed on by both the UE and the 5GC side.

Action 109-113. The UE interacts with 5GC Network Functions to perform PDU session setup and setup the default bearer for the IMS signaling as per 3GPP TS 23.502.

Thereafter an IMS Registration as per 3GPP TS 24.229, Annex U, is triggered by the UE.

Normally the P-CSCF addresses can be configured in the SMF as configuration parameters. They may however also be obtained from an NRF using 5GC service discovery procedure using a new enhanced IMS (eIMS) solution to interwork with the service based architecture 5GC as proposed by the embodiments herein.

The P-CSCF may register to the NRF by invoking the NRF services and operations, such as NFRegister, NFUpdate, NFDeregister operations of an Nnrf_NFManagement service, as defined in the 3GPP TS 23.502 [4] clause 5.2.7 to register, update and/or deregister the P-CSCF address, location information (such as Cell-Id, Tracking Area (TA)), services and/or slice types supported by the P-CSCF. When the P-CSCF profile changes, P-CSCF may use the NFUpdate operation of Nnrf_NFManagement service to update the profile of the P-CSCF stored in the NRF.

The SMF may invoke the NRF services and operations, such as Nnrf_NFDiscovery service and NFStatusSubscribe, NFStatusNotify, NFStatusUnSubscribe operations of Nnrf_NFManagement service to discover and subscribe/unsubscribe and receive updates of the P-CSCF address list from the NRF. The SMF may e.g. discover the P-CSCF address list during the IMS PDU session establishment procedure.

The embodiments described herein provide a method for dynamically allocating P-CSCF address to a UE. The embodiments herein proposes a method to dynamically allocate P-CSCF addresses with TCP or/and UDP transport type and/or port number in the 5G packet core (5GC) by using the information received from service discovery procedure. The P-CSCF address, transport type and/or port number are registered by P-CSCF and discovered by SMF using the service discovery procedure via the NRF.

Figure 2:
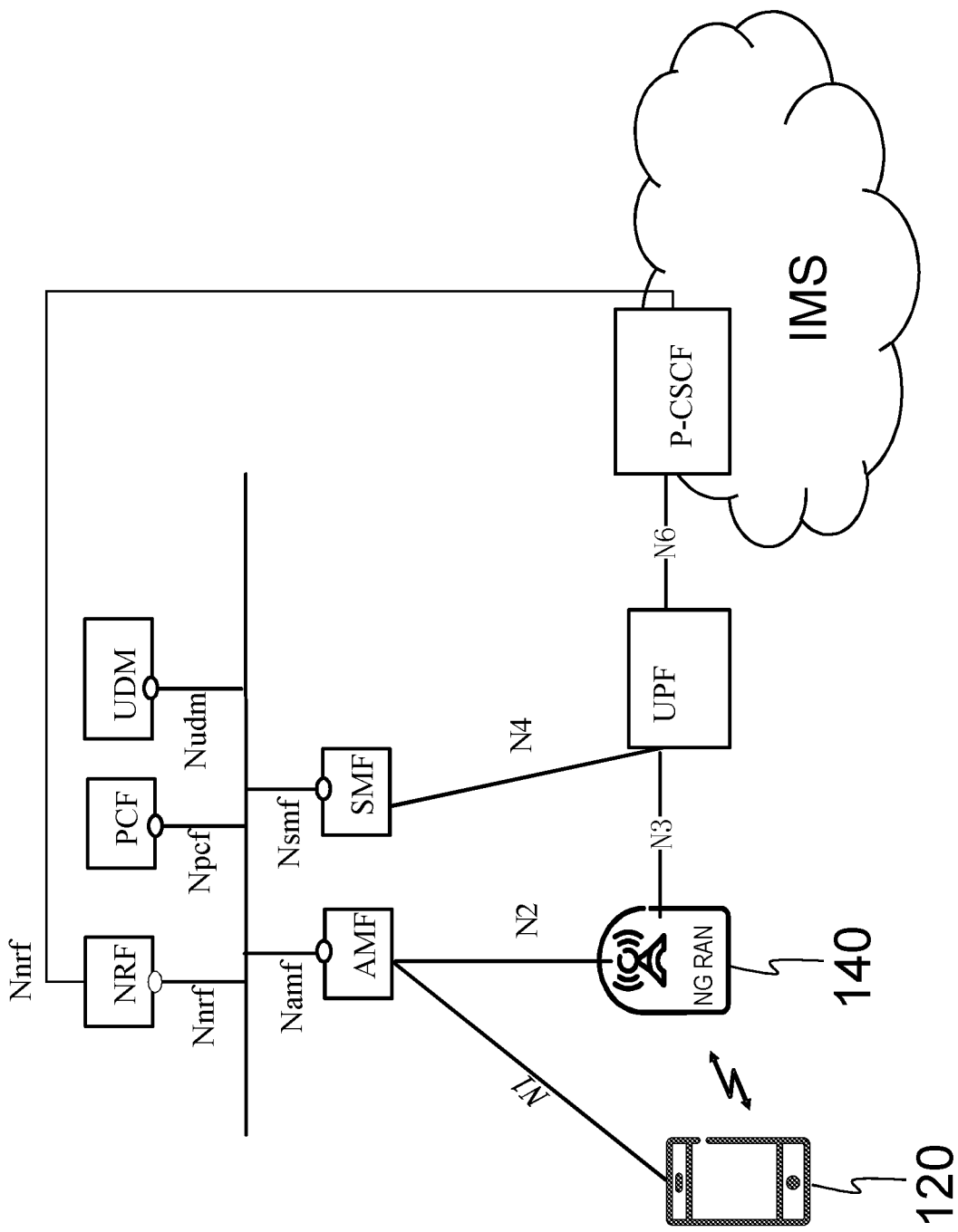
FIG. 2 is a schematic overview depicting a wireless communications network.

Embodiments herein relate to a communication network in general. FIG. 2 is a schematic overview depicting a communication network 100. The communication network 100 comprises a Radio Access Network (RAN) and a Core Network (CN). The communication network 100 may use a number of different technologies, such as Wi-Fi, Long Term Evolution (LTE), LTE-Advanced, 5G, 2G/3G, CDMA, UTRAN, GERAN, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in both a 5G, 4G, 3G and 2G context. Earlier technologies using CS domains are herein also referred to as legacy communication networks, legacy core networks or legacy RAN depending on the specific part of the network that it refers to.

In the communication network 100, wireless devices e.g. a User Equipment (UE) 120 such as a mobile station, a non-access point (non-AP) STA, a STA, a wireless device and/or a wireless terminal, communicate via an Access Network (AN), e.g. a RAN, with the CN. It should be understood by those skilled in the art that an UE is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The communication network 100 comprises a set of radio network nodes, such as radio network nodes 140 each providing radio coverage over one or more geographical areas of a radio access technology (RAT), such as 5G New Radio (NR), LTE, UMTS, GSM, Wi-Fi or similar. The radio network node 140, 160 may be a radio access network node such as a radio network controller or an access point such as a wireless local area network (WLAN) access point or an Access Point Station (AP STA), an access controller, a base station, e.g. a radio base station such as a NodeB, an evolved Node B (eNB, eNodeB), a 5G nodeB (gNB), a base transceiver station, Access Point Base Station, base station router, a transmission arrangement of a radio base station, a standalone access point or any other network unit capable of serving a wireless device within the cell, which may also be referred to as a service area, served by the radio network node 140, 160 depending e.g. on the first radio access technology and terminology used. The radio network node 140 is comprised in the radio access network (RAN).

The communications network may comprise one or more Public Land Mobile Networks (PLMNs). The PLMNs may be run by different operators and when a subscribed user uses his operator's PLMN then this PLMN may be referred to as a Home-PLMN (hPLMN). Roaming however allows users to move outside their home network and to use resources from other operator's network. Such a network operated by a different operator than the subscribed operator may be referred to as a Visited-PLMN (vPLMN).

The CN shown herein is based on a service based system architecture. Wherever suitable the architecture elements are defined as network functions that offer their services via interfaces of a common framework to any network functions that are permitted to make use of these provided services. One or more Network Repository Functions (NRF) allow each network function to discover the services offered by other network functions. This architecture model, which further adopts principles like modularity, reusability and self-containment of network functions, enable deployments to take advantage of the latest virtualization and software technologies. The related service based architecture figures depict those service based principles by showing the network functions, primarily Core Network functions, with a single interconnect to the rest of the system to enable inter-PLMN interconnection across various NFs.

The UE interfaces the IMS data network by means of the P-CSCF and obtains subscription information via e.g. a Unified Data Management (UDM), subscriber authentication via an Authentication Server Function (AUSF) and UE specific policies via a Policy Control Function (PCF). Network slice selection via a Network Slice Selection Function (NSSF), network access control and mobility management via an Access and Mobility Management Function (AMF), data service management via a Service Management Function (SMF) and application functions (AF) are provided by the vPLMN. A User Plane Function (UPF) manages the user plane.

Figure 3:
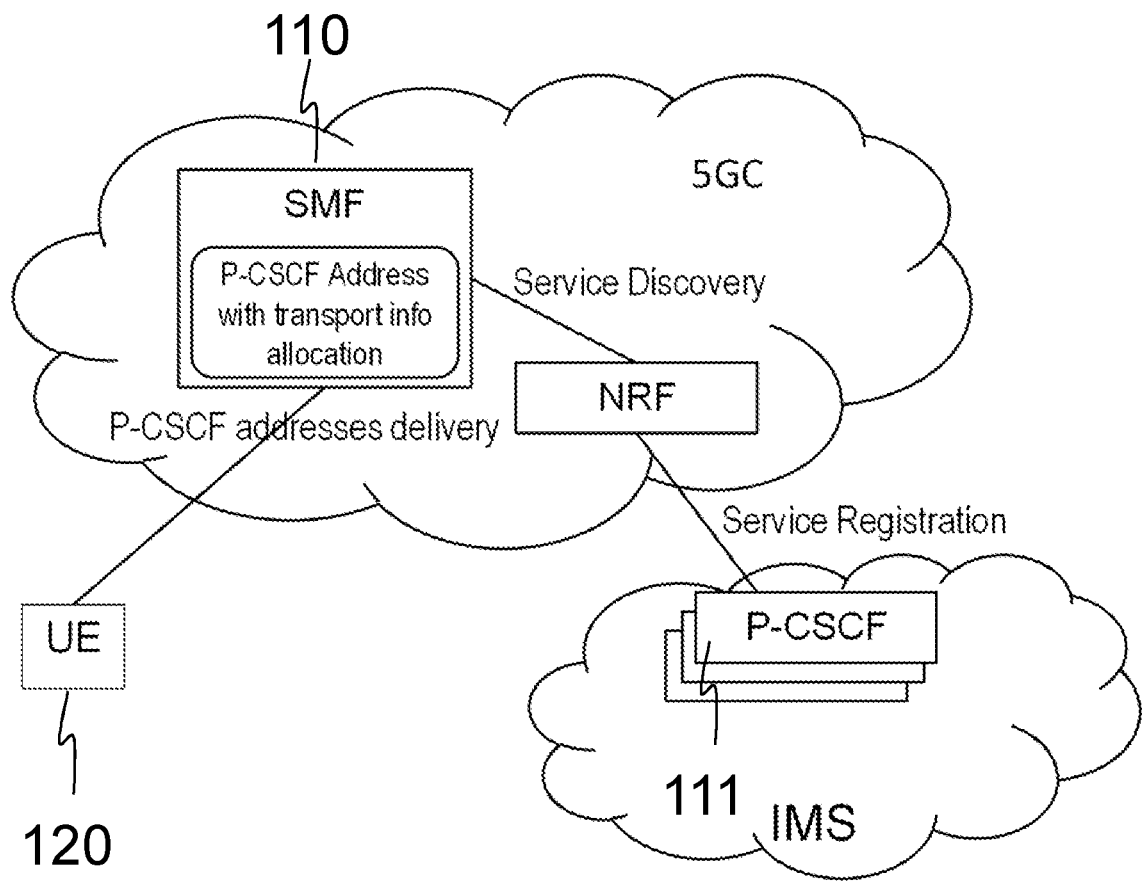
FIG. 3 is a schematic overview depicting parts of a wireless communications network according to the embodiments herein.

As depicted in FIG. 3, during installation or termination, a second network node 111, such as the P-CSCF, provides access to the IMS and therefore acts as an entrance point to the IMS for the UE 120. An instance of the second network node 111, such as a P-CSCF instance, may register service information, such as P-CSCF service information, using a service registration or de-registration function provided by the NRF. The service information comprises an address of the second network node, which address may e.g. be an IPv4 or an IPv6 address. A first network node 110, such as the SMF, may collect, which may also be referred to as obtain, the address of the second network node, such as a P-CSCF address. The address may e.g. be obtained by invoking the Nnrf_NFDiscovery and Nnrf_NFManagement service to discover and obtain an updated address list from the NRF. The SMF may further use an address allocation function, such as a P-CSCF address allocation function, to create a Protocol Configuration Option (PCO) field with the list of addresses, such as P-CSCF addresses. The list may comprise port number and/or transport type, such as UDP and/or TCP. The list is sent to the UE 120 at a PDU Session Establishment procedure related to IMS.

The P-CSCF may invoke the NFRegister operation of Nnrf_NFManagement service to register its NF profile in the NRF. The NF profile may comprise a custom info object which a prioritized list of transport type UDP/TCP, and port numbers supported by each P-CSCF.

The SMF may invoke the NRF services and operations, such as Nnrf_NFDiscovery service and NFStatusSubscribe, NFStatusNotify, NFStatusUnSubscribe operations of Nnrf_NFManagement service to discover and subscribe/ unsubscribe and get updated of the P-CSCF address list from NRF, such as discovering the P-CSCF address.

At the IMS PDU Session Establishment procedure, the SMF, e.g. by means of a P-CSCF Address Allocation Function in the SMF, may pack several P-CSCF addresses with a corresponding transport protocol and/or port number into the PCO field. A new PCO field for the transport protocol type and/or port number may be added to the existing information in the PCO. The PCO may then be sent back to the AMF in the Namf_Communication_N1N2MessageTransfer which is in turn returned to the UE 120 via the PDU Session establishment interaction procedure.

Figure 4:
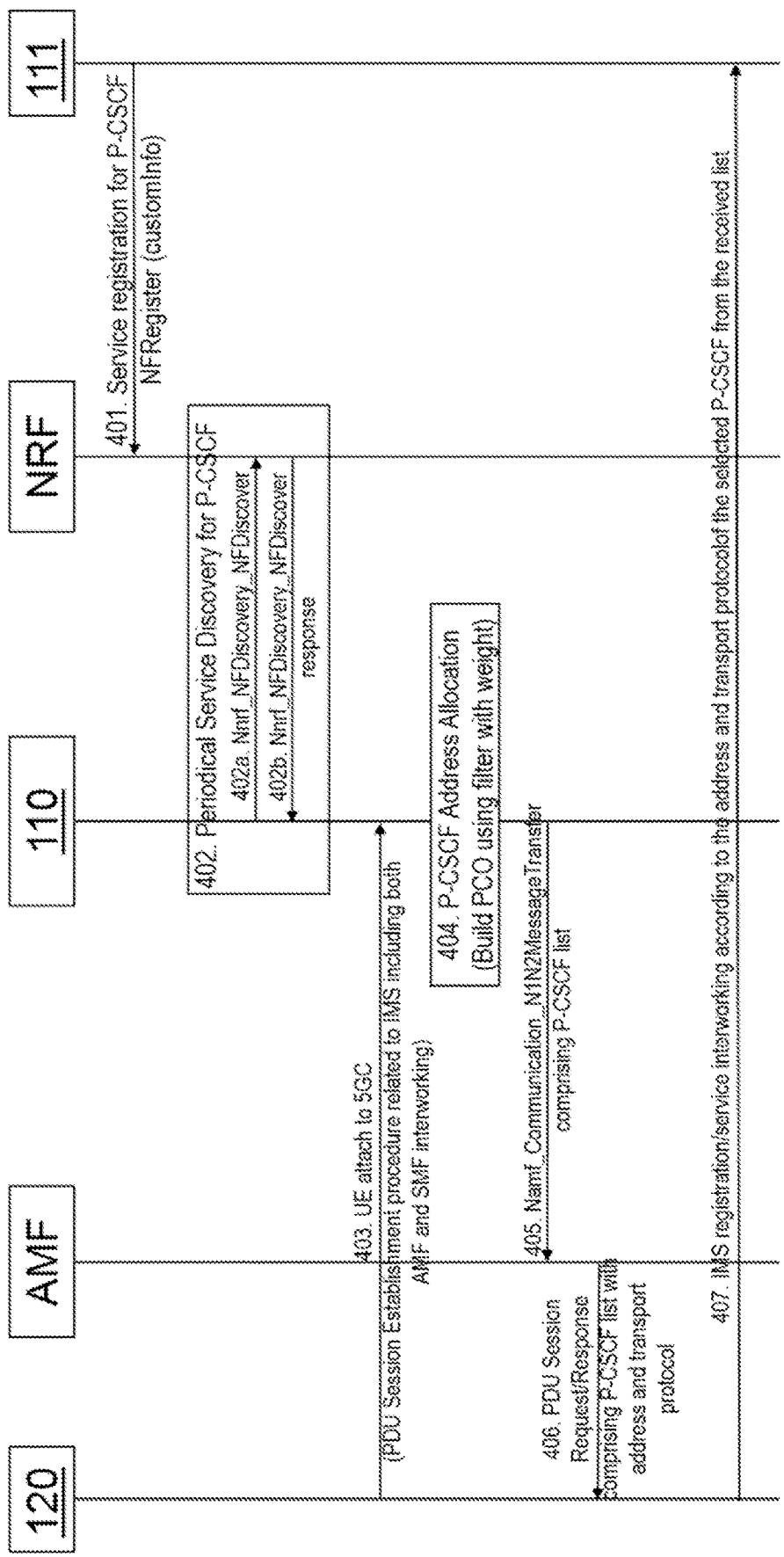
FIG. 4 is a signaling diagram depicting a method for handling discovery of entrance points to an IMS network according to embodiments herein.

FIG. 4 discloses an overview of the solution according to the embodiments herein. In the example shown in FIG. 4 the first network node 110 is exemplified by means of the SMF and the second network node 111 is exemplified by means of the P-CSCF.

Action 401: When the P-CSCF is instantiated due to for example a new deployment or scaling-out, the P-CSCF registers its service profile to the NRF. The P-CSCF may invoke the NFRegister operation of Nnrf_NFManagement service to register its NF profile in the NRF. The NF profile may comprise a custom info object which may comprise a list of transport types, such as transport protocols, and/or port numbers supported for each transport type.

Action 402: In order to allocate a P-CSCF instance to the UE 120 the SMF needs to maintain an up-to-date P-CSCF instances list. The SMF may retrieve the available list of P-CSCF instances from the NRF periodically, or may subscribe to the NRF to be notified of any changes, such as addition, changes, and/or deletions of P-CSCFs. The SMF may send a request, such as an Nnrf_NFDiscovery request, to retrieve the available list of P-CSCF instance that are currently registered in the NRF. The SMF may obtain the list of P-CSCF instances from the NRF with an array of NF profile objects. The SMF may store the list as the latest P-CSCF instances list.

Action 403: When the UE 120 has successfully registered in the 5GC it may perform IMS PDU session establishment according to IMS PDU establishment per 3GPP TS 23.502, section 4.3.2, by interacting with the AMF which in turn calls the SMF.

Action 404: Based on the latest stored P-CSCF instances list, the SMF may construct a PCO comprising the P-CSCF instance, a preferred transport protocol and/or a port number. The SMF may e.g. use a P-CSCF Address Allocation Function to construct the PCO. The preferred transport protocol may e.g. be indicated by providing the specific transport protocol to be used, such as UDP or TCP, or by using protocol prioritization. Protocol prioritization means that a plurality of transport protocols may be indicated as being supported by a P-CSCF instance, the different transport protocols may however be provided with different priority. The transport protocol having the highest priority is the preferred transport protocol which should be used. The transport protocol having a lower priority may however also be used in case there is a problem with using the preferred transport protocol. For example, in case only TCP transport is available and/or provided in the P-CSCF instance list, it means only TCP will be used. In case TCP is preferred over UDP, the TCP may have a higher priority indication than the UDP, or vice versa, for each P-CSCF instance. TCP may e.g. be preferred for 5G voice, as it can reduce the total call setup time for EPS fallback in a voice over 5G solution.

The priority indication may e.g. be applied to the port number corresponding to the transport protocol having the highest priority for each P-CSCF instance in the list.

Action 405: The SMF sends the P-CSCF list comprised in the PCO to the AMF. This may e.g. be sent in the Namf_Communication_N1N2MesssageTransfer message.

Action 406: The AMF sends the P-CSCF list to the UE 120 in the PDU session establishment request/response with the UE, as per 3GPP TS 23.502, section 4.3.2.

Action 407: The UE 120 can now start to use the P-CSCF address list, e.g. according to the priority order if indicated, to access the P-CSCF for IMS registration and service according to 3GPP TS 24.229. Additionally, the UE 120 may use the newly added prioritized list of transport type and port number info per P-CSCF address to send SIP messages to the P-CSCF in the IMS.

The method actions performed by the first network node 110 in the communications network, for handling of discovery of entrance points of the UE 120 to the IMS network, during an IMS PDU session setup, according to embodiments herein, will now be described with reference to a flowchart depicted in FIG. 5. The actions do not have to be taken in the order stated below, but may be taken in any suitable order. Actions performed in some embodiments only are marked with dashed boxes.

Action 5010: The first network node 110 obtains a list of IMS entrance point instances, wherein the list of IMS entrance point instances comprises an address of each IMS entrance point instance and one or more transport protocols supported by each IMS entrance point instance. The IMS entrance point instance may e.g. be a P-CSCF instance.

The list of IMS entrance point instances may further comprise a port number for each transport protocol supported by each of the IMS entrance point instances.

The transport protocol supported by the IMS entrance point instance may be the UDP and/or the TCP.

The first network node may e.g. obtain the list of IMS entrance point instances by retrieving the list from the NRF, e.g. by sending a Network Function discovery request to the NRF.

This action 5010 corresponds to action 402 as described in relation to FIG. 4 herein.

Action 5020: The first network node 110 generates, based on the obtained list of IMS entrance point instances, a configuration message for IMS entrance point discovery. The configuration message comprises the address of the IMS entrance point instance and the one or more transport protocols supported by each IMS entrance point instance.

The configuration message may further comprise a preferred transport protocol. The preferred transport protocol may e.g. be indicated by specifying a transport protocol to be used or by providing a priority indication for each of the transport protocols supported.

The configuration message may e.g. be a PCO.

This action 5020 corresponds to action 404 as described in relation to FIG. 4 herein.

Action 5030: The first network node 110 further provides the generated configuration message to the UE 120.

This action 5030 is similar to action 405 as described in relation to FIG. 4 herein.

The method actions performed by the second network node 111 in the communications network 100, for handling of discovery of entrance points of the UE 120 to the IMS network, during an IMS PDU session setup, according to embodiments herein will now be described with reference to a flowchart depicted in FIG. 6. The second network node 111 may be instantiated by a P-CSCF. The IMS entrance point instance may be a P-CSCF instance.

The actions do not have to be taken in the order stated below, but may be taken in any suitable order. Actions performed in some embodiments only are marked with dashed boxes.

Action 6010: In some embodiments, the second network node 111 may prioritize the available IMS entrance point instances and/or the transport protocols supported by each IMS entrance point instance.

This action 6010 is similar to the action 404 described in relation to FIG. 4.

Action 6020: The second network node 111 provides, to the first network node, a list of IMS entrance point instances available in the second network node. The list of IMS entrance point instances comprises an address of each IMS entrance point instance and one or more transport protocols supported by each IMS entrance point instance.

The list of IMS entrance point instances may further comprise an indication of the priority of each IMS entrance point instance and/or transport protocol for each IMS entrance point instance.

The list of IMS entrance point instances may further comprise a port number for each transport protocol supported by each IMS entrance point instance.

The list of IMS entrance point instances may be provided to the first network node 110 by registering the list in the NRF.

This action 6020 is similar to action 401 described in relation to FIG. 4.

The method actions performed by the UE 120 in the communications network 100, for handling of discovery of entrance points of the UE to the IMS network, during an IMS PDU session setup, according to embodiments herein will now be described with reference to a flowchart depicted in FIG. 7. The IMS entrance point instance may be a P-CSCF instance.

The actions do not have to be taken in the order stated below, but may be taken in any suitable order. Actions performed in some embodiments only are marked with dashed boxes.

Action 7010: In some embodiments, the UE 120 receives, from the first network node 110, a configuration message comprising a list of IMS entrance point instances available in a second network node. The list of IMS entrance point instances comprises an address of each IMS entrance point instance and one or more transport protocols supported by each IMS entrance point instance.

The list of IMS entrance point instances may further comprise an indication of the priority of each IMS entrance point instance and/or transport protocol for each IMS entrance point instance.

The list of IMS entrance point instances may further comprise a port number for each transport protocol supported by each IMS entrance point instance.

This action 7010 is similar to the actions 405 and 406 described in relation to FIG. 4.

Action 7020: The UE 120 performs, based on the received list of IMS entrance point instances available in the second network node 111, a registration to the IMS via the second network node 111.

When the list of IMS entrance point instances comprises indication of the priority of each IMS entrance point instance and/or transport protocol for each IMS entrance point instance, the UE 120 performs the registration to the IMS using the IMS entrance point instance and/or transport protocol according to the priority indication.

This action 7020 is similar to the action 407 described in relation to FIG. 4.

The above steps describe a basic embodiment, additional embodiments will be described in the following.

Figure 8:
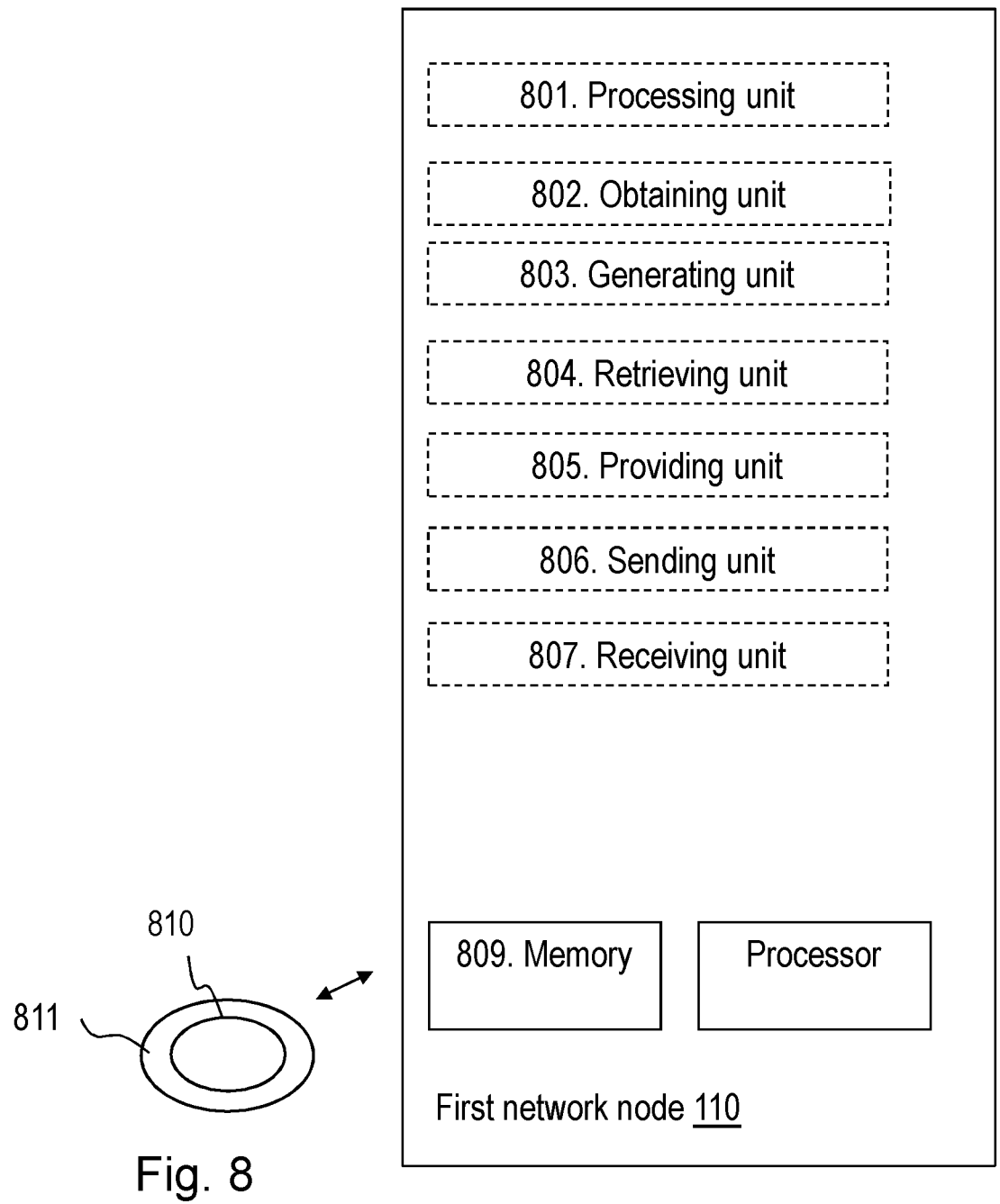
FIG. 8 is a block diagram illustrating some first embodiments of a first network node according to embodiments herein.

FIG. 8 is a block diagram depicting the first network node 110 in the communications network, for performing a method for handling of discovery of entrance points of a UE to an IMS network, during an IMS PDU session setup.

The first network node 110 may comprise a processing unit 801, such as e.g. one or more processors, an obtaining unit 802, a generating unit 803, a retrieving unit 804, a providing unit 805, a sending unit 806, and a receiving unit 807 as exemplifying hardware units configured to perform the methods described herein.

The first network node 110 is configured to, e.g. by means of the processing unit 801 and/or the obtaining unit 802 being configured to, obtain the list of IMS entrance point instances, wherein the list of IMS entrance point instances comprises an address of each IMS entrance point instance and one or more transport protocols supported by each IMS entrance point instance.

The first network node 110 is configured to, e.g. by means of the processing unit 801 and/or the generating unit 804 being configured to, generate, based on the obtained list of IMS entrance point instances, a configuration message for IMS entrance point discovery, comprising the address of the IMS entrance point instance and the one or more transport protocols supported by each IMS entrance point instance.

The first network node 110 may be configured to, e.g. by means of the processing unit 801, the providing unit 805 and/or the sending unit 806 being configured to, provide, to the UE 120, the generated configuration message.

The first network node 110 may further be configured to, e.g. by means of the processing unit 801 and/or the generating unit 804 being configured to, generate the configuration message further comprising a preferred transport specified by a transport protocol to be used or by providing a priority indication for each transport protocol supported.

The first network node 110 may be configured to, e.g. by means of the processing unit 801 and/or the generating unit 804 being configured to, generate the configuration message by adding further a port number for each transport protocol supported by each IMS entrance point instance to the list of IMS entrance point instances.

The first network node 110 may be configured to, e.g. by means of the processing unit 801 and/or the generating unit 804 being configured to, generate the configuration message as a PCO.

The first network node 110 may be configured to, e.g. by means of the processing unit 801, the obtaining unit 802 and/or the retrieving unit 804 being configured to, obtain the list of IMS entrance point instances by retrieving the list from the NRF.

The first network node 110 may be configured to, e.g. by means of the processing unit 801, the obtaining unit 802, the retrieving unit 804 and/or the sending unit 806 being configured to, retrieve the list of IMS entrance point instances by sending a Network Function discovery request to the NRF.

The first network node 110 may further comprise a memory 809. The memory may comprise one or more memory units to be used to store data on, such as software, patches, system information (SI), configurations, diagnostic data, performance data and/or applications to perform the methods disclosed herein when being executed, and similar.

Figure 5:
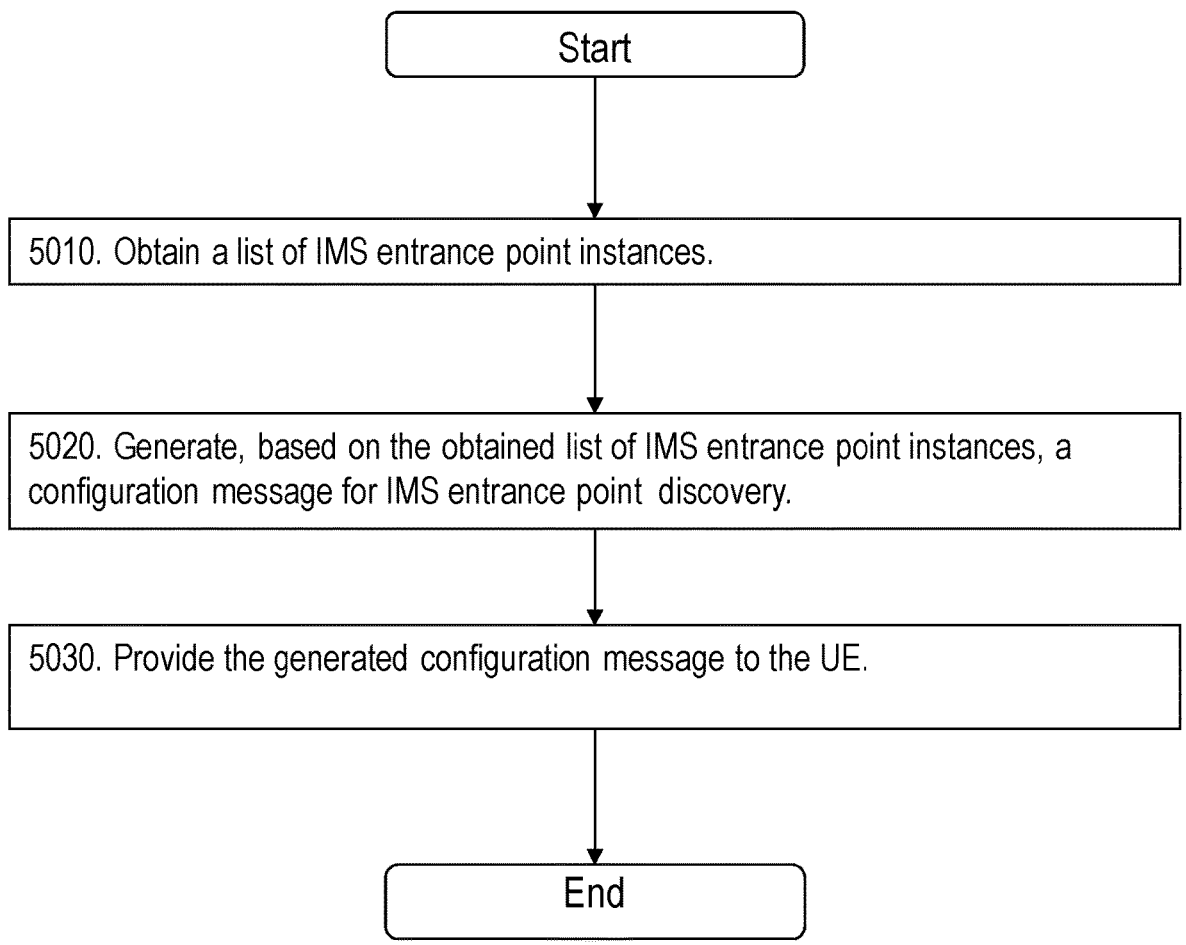
FIG. 5 is a flowchart depicting a method for handling discovery of entrance points to an IMS network performed by a first network node according to embodiments herein.

The embodiments herein may be implemented through a respective processor or one or more processors of a processing circuitry in the first network node 110 as depicted in FIG. 9, which processing circuitry is configured to perform the method actions according to FIG. 5 and the embodiments described above for the first network node 110.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the first network node 110. One such carrier may be in the form of a CD ROM disc. It is however feasible with other data carriers such as e.g. a memory stick. The computer program code may furthermore be provided as pure program code on a server and downloaded to the first network node 110.

The method according to the embodiments described herein for the first network node 110 may be implemented by means of e.g. a computer program product 810, 901 or a computer program, comprising instructions, i.e., software code portions, which, when executed on at least one processor, cause at least one processor to carry out the actions described herein, as performed by the first network node 110. The computer program product 810, 901 may be stored on a computer-readable storage medium 811, 902, e.g. a disc or similar. The computer-readable storage medium 811, 902, having stored thereon the computer program, may comprise instructions which, when executed on at least one processor, cause the at least one processor to carry out the actions described herein, as performed by the first network node 110. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

Figure 10:
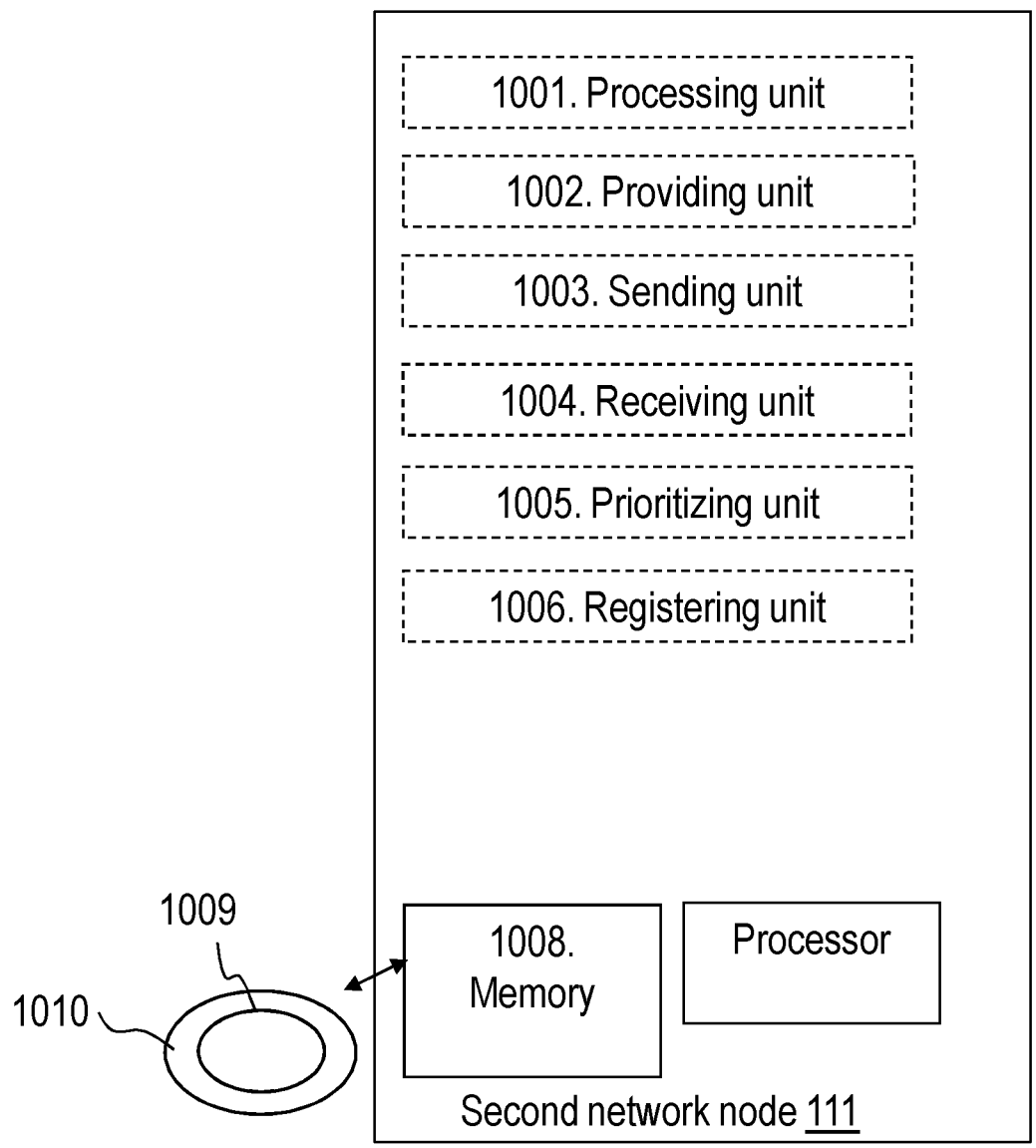
FIG. 10 is a block diagram illustrating some first embodiments of a second network node according to embodiments herein.

FIG. 10 is a block diagram depicting the second network node 111 in the communications network 100, for performing a method for handling of discovery of entrance points of a UE to an IMS network, during an IMS PDU session setup. The second network node 111 may be instantiated by the P-CSCF.

The second network node 111 may comprise a processing unit 1001, such as e.g. one or more processors, a providing unit 1002, a sending unit 1003, a receiving unit 1004, a prioritizing unit 1005 and/or a registering unit 1006 as exemplifying hardware units configured to perform the methods described herein.

The second network node 111 is configured to, e.g. by means of the processing unit 1001, the sending unit 1003 and/or the providing unit 1002 being configured to, provide, to a first network node 110, a list of IMS entrance point instances available in the second network node 111, wherein the list of IMS entrance point instances comprises an address of each IMS entrance point instance and one or more transport protocols supported by each IMS entrance point instance.

The second network node 111 may further be configured to, e.g. by means of the processing unit 1001, and/or the prioritizing unit 1005 being configured to, prioritize the available IMS entrance point instances and/or the transport protocols supported by each IMS entrance point instance.

The second network node 111 may further be configured to, e.g. by means of the processing unit 1001, the sending unit 1003 and/or the providing unit 1002 being configured to, provide the list of IMS entrance point instances further comprising an indication of the priority of each IMS entrance point instance and/or transport protocol for each IMS entrance point instance.

The second network node 111 may further be configured to, e.g. by means of the processing unit 1001, the sending unit 1003 and/or the providing unit 1002 being configured to, provide a port number for each transport protocol supported by each IMS entrance point instance in the list of IMS entrance point instances.

The second network node 111 may further be configured to, e.g. by means of the processing unit 1001, the sending unit 1003, the providing unit 1002 and/or the registering unit 1006 being configured to, provide the list of IMS entrance point instances to the first network node 110 by registering the list in the NRF.

The second network node 111 may further comprise a memory 1008. The memory may comprise one or more memory units to be used to store data on, such as software, patches, system information (SI), configurations, diagnostic data, performance data and/or applications to perform the methods disclosed herein when being executed, and similar.

Figure 6:
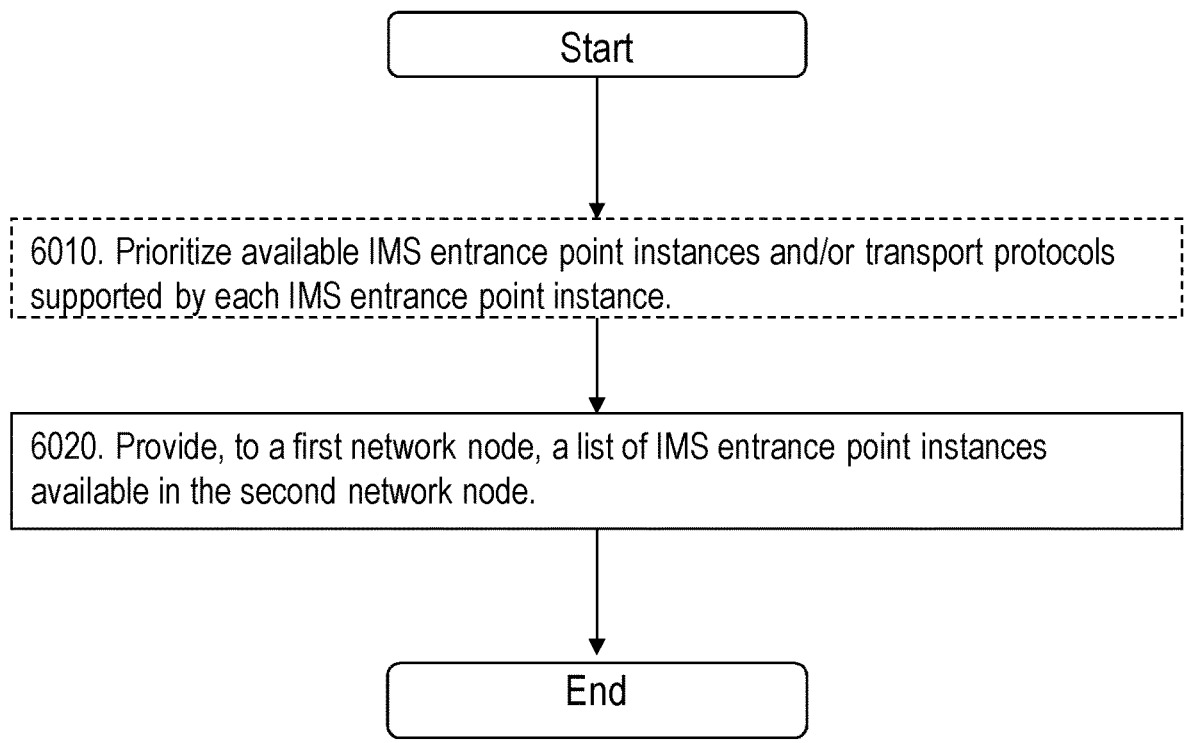
FIG. 6 is a flowchart depicting a method for discovery of entrance points to an IMS network performed by a second network node according to embodiments herein.

The embodiments herein may be implemented through a respective processor or one or more processors of a processing circuitry in the second network node 111 as depicted in FIG. 11, which processing circuitry is configured to perform the method actions according to FIG. 6 and the embodiments described above for the second network node 111.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the second network node 111. One such carrier may be in the form of a CD ROM disc. It is however feasible with other data carriers such as e.g. a memory stick. The computer program code may furthermore be provided as pure program code on a server and downloaded to the second network node 111.

The method according to the embodiments described herein for the second network node 111 may be implemented by means of e.g. a computer program product 1009, 1101 or a computer program, comprising instructions, i.e., software code portions, which, when executed on at least one processor, cause at least one processor to carry out the actions described herein, as performed by the second network node 111. The computer program product 1009, 1101 may be stored on a computer-readable storage medium 910, 1102, e.g. a disc or similar. The computer-readable storage medium 910, 1102, having stored thereon the computer program, may comprise instructions which, when executed on at least one processor, cause the at least one processor to carry out the actions described herein, as performed by the second network node 111. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

Figure 12:
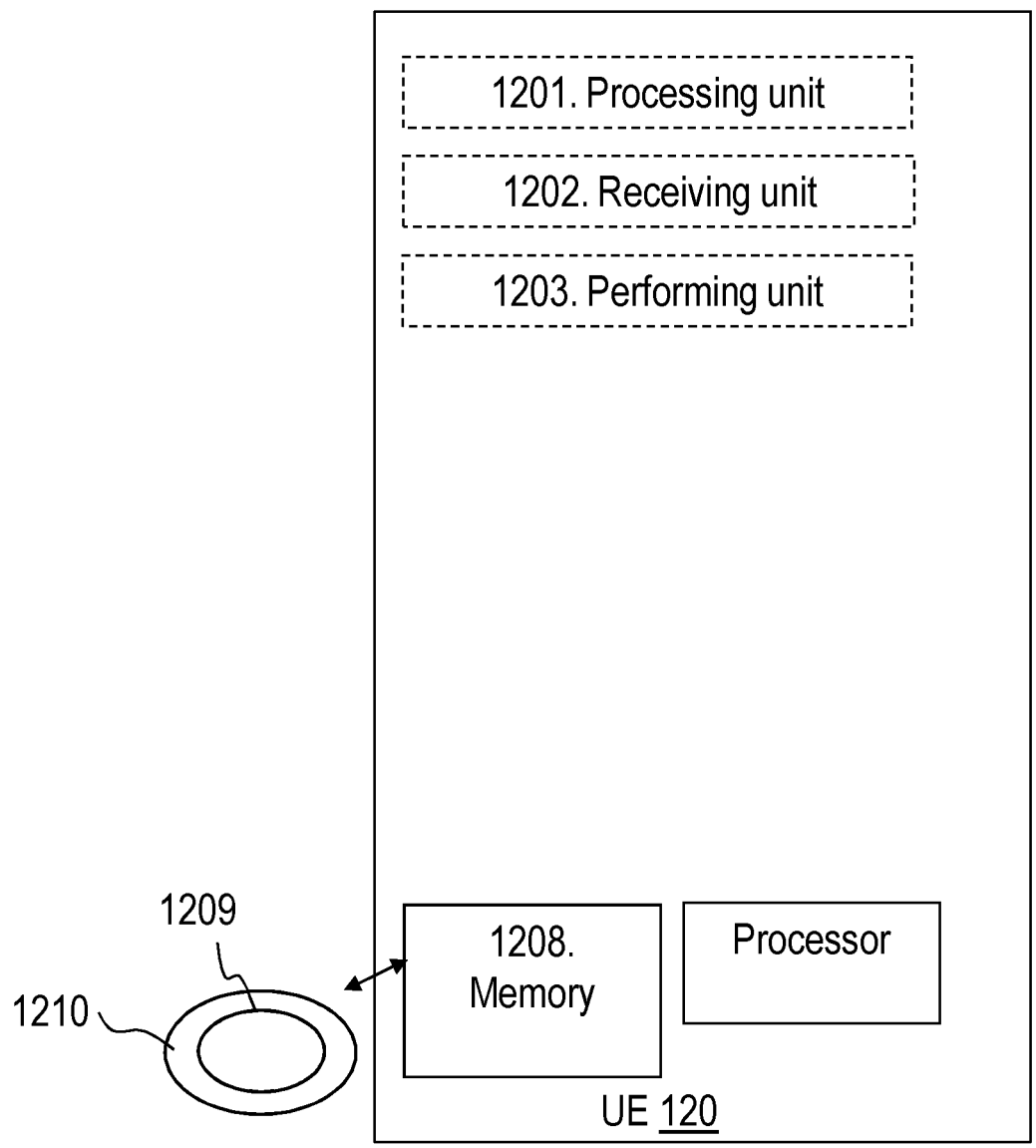
FIG. 12 is a block diagram illustrating some first embodiments of a UE according to embodiments herein.

FIG. 12 is a block diagram depicting the UE 120 in the communications network 100, for performing a method for handling of discovery of entrance points of the UE 120 to an IMS network, during an IMS PDU session setup.

The UE 120 may comprise a processing unit 1201, such as e.g. one or more processors, a receiving unit 1202 and/or a performing unit 1203 as exemplifying hardware units configured to perform the methods described herein.

The UE 120 is configured to, e.g. by means of the processing unit 1201 and/or the receiving unit 1202 being configured to, receive, from the first network node 110, a configuration message comprising a list of IMS entrance point instances available in the second network node 111, wherein the list of IMS entrance point instances comprises an address of each IMS entrance point instance and one or more transport protocols supported by each IMS entrance point instance.

The UE 120 is configured to, e.g. by means of the processing unit 1201 and/or the performing unit 1203 being configured to, perform, based on the received list of IMS entrance point instances available in the second network node 111, a registration to the IMS via the second network node 111.

The UE 120 may be configured to, e.g. by means of the processing unit 1201 and/or the performing unit 1203 being configured to, perform the registration based on the received list of IMS entrance point instances by using the IMS entrance point instance and/or transport protocol for each instance having the highest priority.

The UE 120 may further comprise a memory 1209. The memory may comprise one or more memory units to be used to store data on, such as software, patches, system information (SI), configurations, diagnostic data, performance data and/or applications to perform the methods disclosed herein when being executed, and similar.

Figure 7:
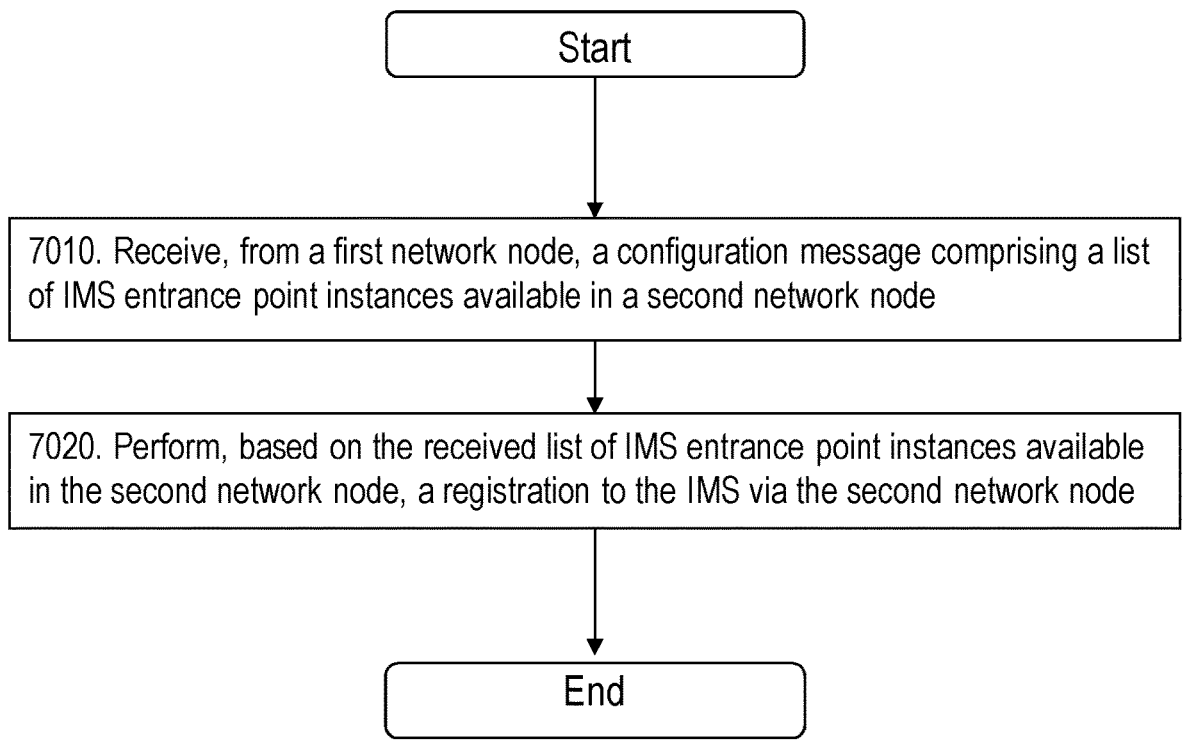
FIG. 7 is a flowchart depicting a method for discovery of entrance points to an IMS network performed by a UE according to embodiments herein.

The embodiments herein may be implemented through a respective processor or one or more processors of a processing circuitry in the UE 120 as depicted in FIG. 13, which processing circuitry is configured to perform the method actions according to FIG. 7 and the embodiments described above for the UE 120.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as e.g. a memory stick. The computer program code may furthermore be provided as pure program code on a server and downloaded to the UE 120.

The method according to the embodiments described herein for the first network node 110 may be implemented by means of e.g. a computer program product 1210, 1301 or a computer program, comprising instructions, i.e., software code portions, which, when executed on at least one processor, cause at least one processor to carry out the actions described herein, as performed by the UE 120. The computer program product 1210, 1301 may be stored on a computer-readable storage medium 1211, 1302, e.g. a disc or similar. The computer-readable storage medium 1211, 1302, having stored thereon the computer program, may comprise instructions which, when executed on at least one processor, cause the at least one processor to carry out the actions described herein, as performed by the UE 120. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes will appreciate the cost, performance, and maintenance trade-offs inherent in these design choices.

When using the word "comprise" or "comprising" it shall be interpreted as non-limiting, i.e. meaning "consist at least of". When using the word "set" herein, it shall be interpreted as meaning "one or more".

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a network node in a communications network, for handling of discovery of entrance points of a User Equipment (UE) to an IP Multimedia Subsystem (IMS) network, during an IMS Protocol Data Unit (PDU) session setup, wherein the method comprises:
    obtaining a list of IMS entrance point instances in which each IMS entrance point instance is a Proxy Call Serving Call Control Function (P-CSCF) instance, wherein the list of IMS entrance point instances comprises an address of each IMS entrance point instance and one or more transport protocols supported by each IMS entrance point instance, and wherein the list of IMS entrance point instances is obtained by retrieving the list from a Network Repository Function (NRF);
    generating, based on the obtained list of IMS entrance point instances, a configuration message for IMS entrance point discovery, comprising addresses of the IMS entrance point instances of the list and the one or more transport protocols supported by each IMS entrance point instance; and
    providing, to the UE, the generated configuration message comprising the addresses of the IMS entrance point instances of the list and the one or more transport protocols supported by each IMS entrance point instance.

2. The method according to claim 1, wherein the configuration message further comprises a preferred transport protocol by specifying a transport protocol to be used or by providing a priority indication for each transport protocol supported.

3. The method according to claim 1, wherein the list of IMS entrance point instances further comprises a port number for each transport protocol supported by each IMS entrance point instance.

4. The method according to claim 1, wherein the configuration message is a Protocol Configuration Option (PCO).

5. The method according to claim 1, wherein the transport protocol supported by the IMS entrance point instance is a User Datagram Protocol (UDP), a Transmission Control Protocol (TCP), or both UDP and TCP.

6. The method according to claim 1, wherein the list of IMS entrance point instances is retrieved by sending a Network Function discovery request to the NRF.

7. A network node in a communications network, for performing a method for handling of discovery of entrance points of a User Equipment (UE) to an IP Multimedia Subsystem (IMS) network, during an IMS Protocol Data Unit (PDU) session setup, wherein the network node comprising:
    at least one processor; and
    a memory comprising instructions which, when executed by the at least one processor, cause the network node to:
        obtain a list of IMS entrance point instances in which each IMS entrance point instance is a Proxy Call Serving Call Control Function (P-CSCF) instance, wherein the list of IMS entrance point instances comprises an address of each IMS entrance point instance and one or more transport protocols supported by each IMS entrance point instance, and wherein the list of IMS entrance point instances is obtained by retrieving the list from a Network Repository Function (NRF);
        generate, based on the obtained list of IMS entrance point instances, a configuration message for IMS entrance point discovery, comprising addresses of the IMS entrance point instances and the one or more transport protocols supported by each IMS entrance point instance; and
        provide, to the UE, the generated configuration message comprising the addresses of the IMS entrance point instances of the list and the one or more transport protocols supported by each IMS entrance point instance.

8. The network node according to claim 7, wherein the network node is to generate the configuration message further comprising a preferred transport specified by a transport protocol to be used or by providing a priority indication for each transport protocol supported.

9. The network node according to claim 7, wherein the network node is further to generate the configuration message by adding further a port number for each transport protocol supported by each IMS entrance point instance to the list of IMS entrance point instances.

10. The network node according to claim 7, wherein the network node is to generate the configuration message as a Protocol Configuration Option (PCO).

11. The network node according to claim 7, wherein the network node is to retrieve the list of IMS entrance point instances by sending a Network Function discovery request to the NRF.

* * * * *